(12) United States Patent
Bohrer et al.

(10) Patent No.: US 12,035,656 B2
(45) Date of Patent: Jul. 16, 2024

(54) METHOD AND ARRANGEMENT FOR CONTROLLING AN OPERATING PARAMETER OF A FORAGE HARVESTER

(71) Applicant: DEERE & COMPANY, Moline, IL (US)

(72) Inventors: Stefan Bohrer, St.Wendel (DE); Matthias Stein, Homburg (DE)

(73) Assignee: DEERE & COMPANY, Moline, IL (US)

( * ) Notice: Subject to any disclaimer, the term of this patent is extended or adjusted under 35 U.S.C. 154(b) by 554 days.

(21) Appl. No.: 17/303,347

(22) Filed: May 27, 2021

(65) Prior Publication Data

US 2022/0022376 A1    Jan. 27, 2022

(30) Foreign Application Priority Data

Jul. 21, 2020   (EP) .................................... 20187054

(51) Int. Cl.
  *A01D 90/02*    (2006.01)
  *A01D 43/08*    (2006.01)
(52) U.S. Cl.
  CPC .......... *A01D 43/085* (2013.01); *A01D 43/087* (2013.01); *A01D 90/02* (2013.01)
(58) Field of Classification Search
  CPC ..... A01D 43/085; A01D 43/087; A01D 90/02
  See application file for complete search history.

(56) References Cited

U.S. PATENT DOCUMENTS

| 2009/0088932 A1* | 4/2009 | Diekhans ............. A01D 41/127 701/50 |
| 2009/0312920 A1* | 12/2009 | Boenig ................ A01D 43/085 701/50 |
| 2015/0009328 A1* | 1/2015 | Escher ............... A01D 41/1273 348/148 |
| 2016/0192590 A1* | 7/2016 | Byttebier ............. A01D 43/085 701/50 |

FOREIGN PATENT DOCUMENTS

| DE | 10230475 A1    | 1/2004 |
| DE | 102006009575 A1 | 9/2007 |
| DE | 102008002006 A1 | 12/2009 |
| DE | 102014219205 A1 | 3/2016 |
| EP | 1671530 A1     | 6/2006 |
| EP | 1956361 A2     | 8/2008 |

(Continued)

OTHER PUBLICATIONS

Brian Luck, Determine KPS with your smartphone, Mar. 1, 2017, pp. 1-3 [online]. Retrieved from the Internet <URL: https://hayandforage.com/articles.sec-12-1-Corn.html>.

(Continued)

*Primary Examiner* — Dalena Tran

(57) ABSTRACT

A method for controlling one or more operating parameters of a forage harvester includes picking up harvested crop from a field by means of a harvesting attachment, processing the harvested crop by means of a chopping device and/or a post-processing device, and ejecting the processed harvested crop onto a loading container. An image of the processed ground-borne harvested crop is recorded by a camera, and an operating parameter of the forage harvester is set or adjusted with a control unit using the image.

11 Claims, 6 Drawing Sheets

(56) References Cited

FOREIGN PATENT DOCUMENTS

| EP | 2020174 A1 | 2/2009 |
|---|---|---|
| EP | 2098109 A1 | 9/2009 |
| EP | 2232978 A1 | 9/2010 |
| EP | 2452550 A1 | 5/2012 |
| EP | 2570968 A2 | 3/2013 |
| EP | 2742791 A2 | 6/2014 |
| EP | 2982232 A2 | 2/2016 |
| EP | 2987396 A1 | 2/2016 |
| EP | 3403487 A1 | 11/2018 |
| EP | 3403488 A1 | 11/2018 |
| EP | 3646703 A1 | 5/2020 |
| WO | WO2006010761 A1 | 2/2006 |

OTHER PUBLICATIONS

Christoffer Bøgelund Rasmussen, Maize Silage Kernel Fragment Estimation Using Deep Learning-Based Object Recognition in Non-Separated Kernel/Stover RGB Images, Department of Architecture, Design & Media Technology, retrieved from an article, dated Aug. 10, 2019, pp. 1-20, doi:10.3390/s19163506.

* cited by examiner

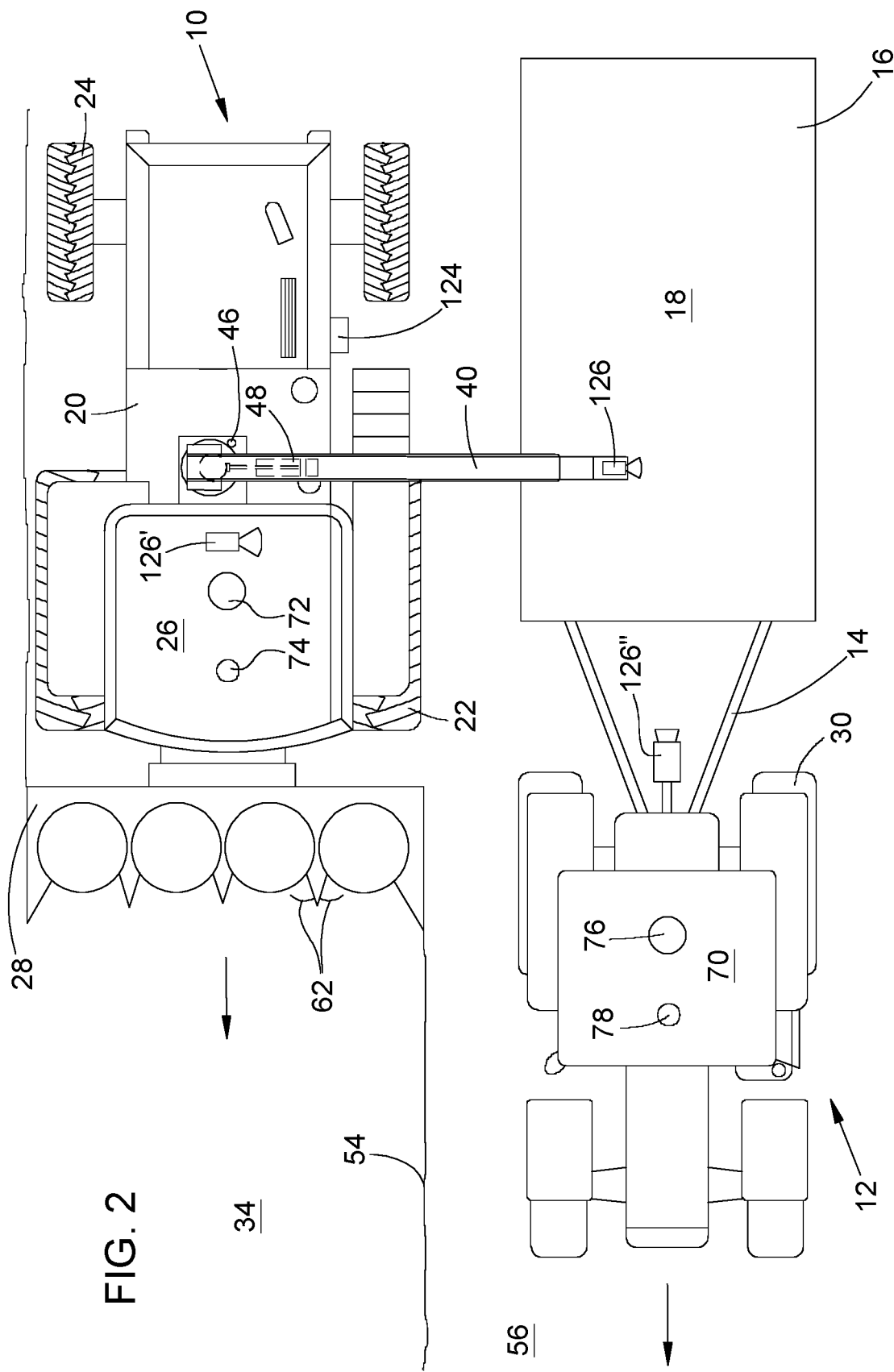

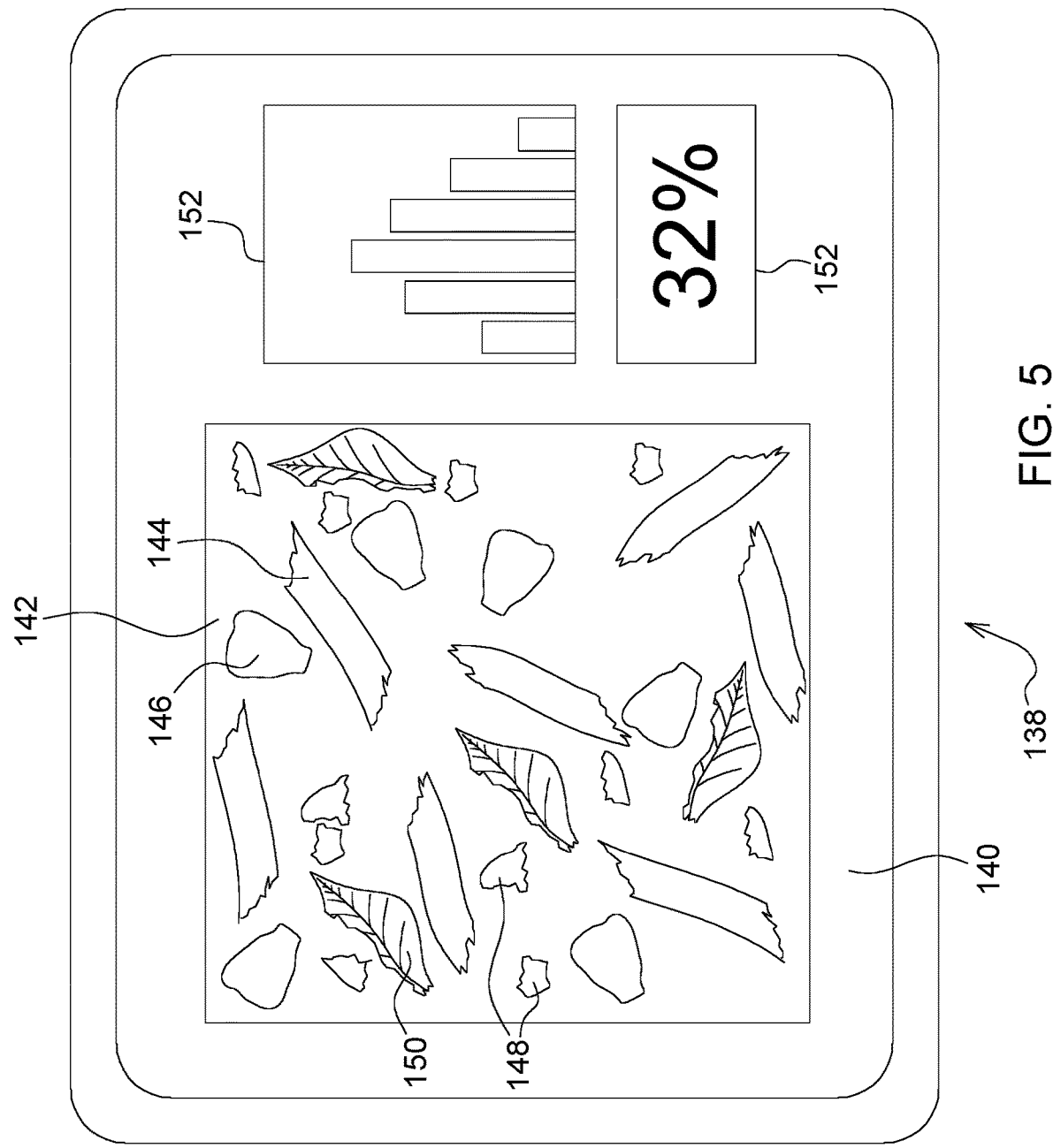

METHOD AND ARRANGEMENT FOR CONTROLLING AN OPERATING PARAMETER OF A FORAGE HARVESTER

CROSS-REFERENCE TO RELATED APPLICATIONS

This application claims priority to and the benefit of European Patent Application No. EP 20187054.0, filed on Jul. 21, 2020, the disclosure of which is hereby incorporated by reference.

TECHNICAL FIELD

The disclosure generally relates to a method of controlling an operating parameter of a forage harvester.

BACKGROUND

Forage harvesters are used in agriculture in order to pick up harvested crop from a field, to comminute the harvested crop and to transfer them through an ejector elbow onto a transport vehicle. The harvested crop are generally stalk-like plants, in particular corn or grass. The chopped harvested crop may be distributed and compressed in a silo in order to produce silage, or the chopped harvested crop may be used for filling a biogas plant.

During the harvesting process using a forage harvester, in some cases it is appropriate that specific properties of the chopped harvested crop are maintained. Thus when the harvested crop are designed to be used in a biogas plant it is expedient to avoid excessive lengths present in the harvested crop, i.e. the proportion of plant portions having lengths which exceed a specific limit value should be below a specific threshold value. Similarly, in the case of corn harvesting, in which the harvested crop are post-processed downstream of the chopper drum of the forage harvester by a kernel processor with two cooperating rollers in order to fracture the corn kernels for the purpose of improved digestibility, it is desirable that the proportion of unprocessed corn kernels, which is denoted in English terminology as the "Corn Silage Processing Score (CSPS)" or "Kernel Processing Score (KPS)", is below a specific limit value.

In the prior art, in addition to laboratory analyses of the harvested crop for determining the proportion of unprocessed corn kernels and mechanical processes for separating and counting the non-beaten kernels, it has been proposed to examine the chopped harvested crop by means of a camera assigned to the ejector elbow in order to measure an actual cut length and if required to adapt to a target value by changing the conveying speed of pre-compression rollers (EP 1,671,530 A1, EP 1,956,361 A2, EP 2,020,174 A1, EP 2,098,109 A1, EP 2,452,550 A1) or in order to detect the proportion of separated and non-separated kernels, and based thereon to adjust an operating parameter of the kernel processor (EP 2,232,978 A1, EP 2,982,232 A2, EP 3,646,703 A1). Since the harvested crop flow into the ejector elbow at a relatively high speed, which is in the order of magnitude of approximately 100 km/h, it is possible only with a significantly high degree of effort (high speed camera, flash unit) to generate sufficiently sharp images which may be processed by an image processing system in order to extract the desired information from the images.

A further approach for determining the proportion of unprocessed corn kernels is to place a sample of the chopped crop in water, to fish out the floating kernels, to place the kernels on a dark background and to take a photograph thereof in order to determine by means of image processing the proportion of non-separated kernels (see for example B. Luck, Determine KPS with your Smartphone, downloaded on Oct. 7, 2020 from https://hayandforage.com/article-1292-determine-kps-with-your-smartphone.html). A method for taking the photograph—without previously fishing out the kernels—directly from the silage which is not processed further and to evaluate the proportion of non-separated kernels by image processing, is described by Rasmussen et al., Maize Silage Kernel Fragment Estimation Using Deep Learning-Based Object Recognition in Non-separated Kernel/Stover RGB Images, Sensors 2019, 19, 3506. As a result, the farmer is may be informed virtually in real time about the proportion of non-separated kernels in the silage.

It might also be mentioned that in the prior art it has been proposed in the case of combine harvesters to record images of the threshed, cleaned harvested crop and amongst other things to examine the broken kernels, to this end the kernel generally being conducted into a bypass of the grain elevator and photographed in the ground-borne state (WO 2006/010761 A1, EP 2 570 968 A2). Such a method is not possible in the forage harvester without further effort, since further means might have to be provided for removing the sample from the harvested crop stream (see DE 102 304 75 A1, DE 10 2006 009 575 A1). Finally, also in the context of a combine harvester, it has been proposed to take a photograph of the lost kernels remaining on the field, in order to determine therefrom the broken kernel fraction and to use this for setting the combine harvester (EP 2 742 791 A2). In practice, however, differentiating the kernels from the substrate has proved problematic.

SUMMARY

A method and a control system for controlling one or more operating parameters of a forage harvester is provided. The method includes picking up harvested crop from a field by means of a harvesting attachment, processing the harvested crop by means of a chopping device and/or a post-processing device, and ejecting the processed harvested crop onto a loading container. An image of the processed ground-borne harvested crop is recorded by means of a camera, and an operating parameter of the forage harvester is set based on the image.

In other words, it is proposed to set the operating parameter using an image—serving as a feedback signal (actual value) for the processing of the harvested crop by the forage harvester—which has been recorded from the ground-borne harvested crop. As a result, a camera of relatively simple construction and which does not necessarily have to be designed as a high-speed camera may be used. Instead, a conventional digital camera may be used, the digital camera being installed, for example, in a mobile telephone or being already present on the forage harvester or a vehicle, which serves for distributing and/or compressing the comminuted harvested crop on a silo, and preferably serving for other purposes there, for example, for controlling the transfer of the harvested crop from the forage harvester onto a transport vehicle, or for steering the vehicle or for controlling the distribution and/or compression of the harvested crop on the silo by the vehicle. In this manner, the degree of effort for controlling the operating parameter is reduced.

In one aspect of the disclosure, using the image, a quality parameter of the harvested crop may be determined by an electronic image processing system, with the operating parameter being set thereby.

The image and/or the quality parameter that is determined by the image processing system and/or an optimized operating parameter derived therefrom may be transmitted to a display unit and/or control unit of the forage harvester. A user may predetermine the operating parameter of the forage harvester using the displayed image and/or the quality parameter and/or the optimized operating parameter, or the control unit may automatically set the operating parameter using the image and/or the quality parameter and/or the optimized operating parameter.

In one aspect of the disclosure, the operating parameter may influence the cut length of the harvested crop and/or an operating parameter of a kernel processor.

The quality parameter may relate to the measured cut length of the harvested crop and/or the proportion of non-separated kernels of the harvested crop processed by the forage harvester.

The camera may detect the image of the harvested crop in the loading container and/or at a collection point of the harvested crop (for example in or upstream of a silo or on a pile of harvested crop heaped up at a biogas plant).

The camera may be attached to the forage harvester or to the loading container or a vehicle bearing or towing the loading container (or a vehicle serving for processing the harvested crop in the silo), or held in the hand by a user.

The image of the camera may also serve for the automatic positioning of the loading container relative to the forage harvester and/or for controlling the position of an ejector elbow of the forage harvester, or for processing (distributing, compressing) the harvested crop in the silo.

The image and/or the quality parameter derived therefrom and/or the optimized operating parameter may be transmitted online from the camera located at the collection point of the harvested crop to the forage harvester. To this end, the image and/or the quality parameter derived therefrom and/or the optimized operating parameter may be uploaded to a server and transmitted therefrom to the forage harvester and/or the control unit thereof or a separate device, for example a mobile telephone of the driver of the forage harvester.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 2 is a schematic plan view of the forage harvester and the transport vehicle which together perform a harvesting and transfer process on a field, wherein the harvested crop are transferred onto the loading container of the transport vehicle.

FIG. 5 is a schematic view of a user interface of the control arrangement.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1A:
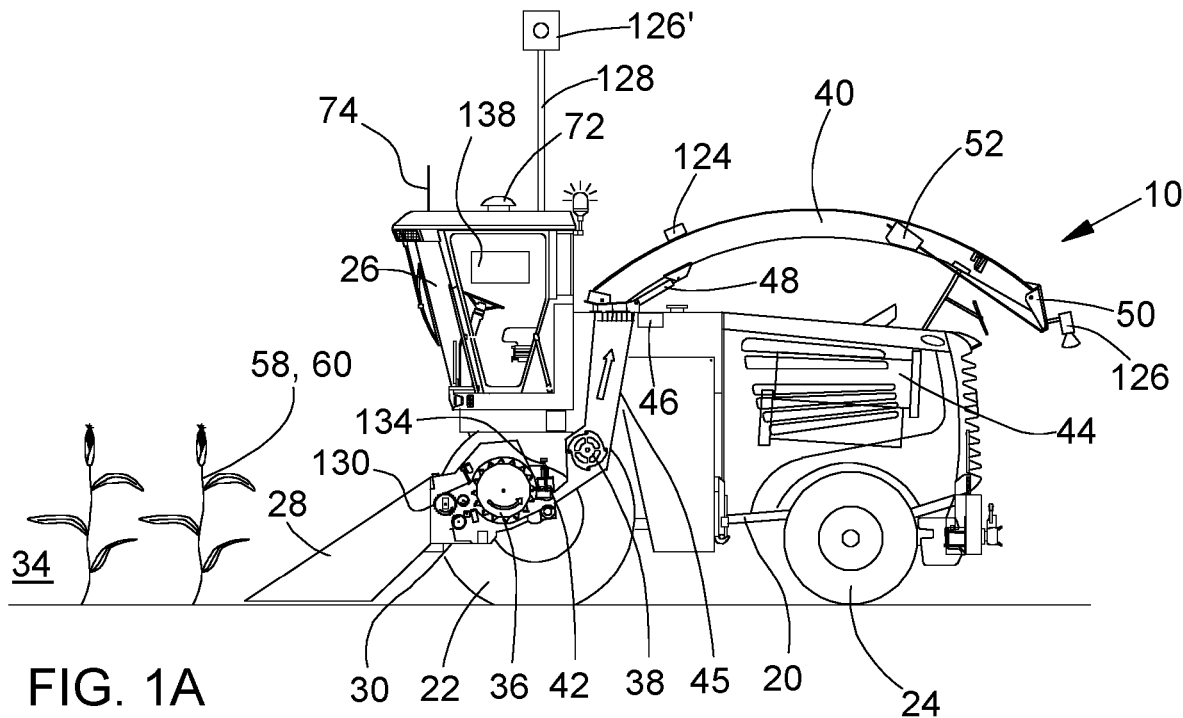
FIG. 1A is a schematic side view of a self-propelled forage harvester.
Figure 1B:
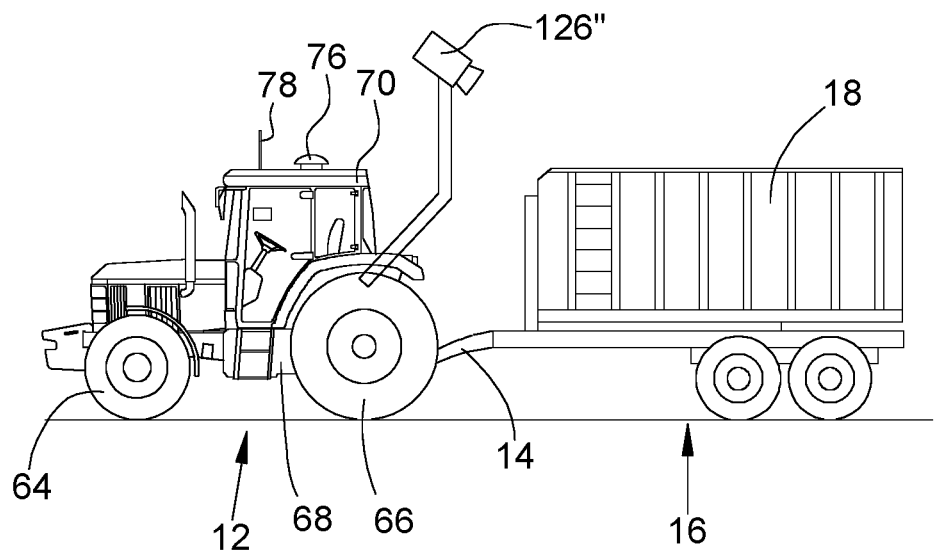
FIG. 1B is a schematic side view of a transport vehicle.

Referring to the Figures, wherein like numerals indicate like parts throughout the several views, a combination shown in FIG. 1 of two agricultural machines includes a self-propelled forage harvester 10 and a transport vehicle 12 in the manner of a self-propelled tractor, which by means of a drawbar 14 tows a trailer 16 which comprises a loading container 18.

The forage harvester 10 is constructed on a frame 20 which is borne by front driven wheels 22 and steerable rear wheels 24. The operation of the forage harvester 10 is carried out from a driver's cab 26 from where a harvesting attachment 28 in the form of a corn harvesting attachment, which is fastened to an inlet channel 30 on the front face of the forage harvester 10, is visible. Harvested crop picked up from a field 34 are supplied by means of the harvesting attachment 28, via an inlet conveyor arranged with pre-compression rollers 130 in the inlet channel 30, to a chopper drum 36 which chops the harvested crop into small pieces and discharges the harvested crop to a blower 38. A post-processing device 42 with two kernel processing rollers extends between the chopper drum 36 and the blower 38. The drive of the aforementioned drivable systems of the forage harvester 10 and the harvesting attachment 28 is carried out by means of an internal combustion engine 44.

The crop discharged by the blower 38 leave the forage harvester 10 for the loading container 18 which is traveling alongside, via a discharge device which is made up of a stationary ejection shaft 45 directly adjoining the blower 38 at the top, and an ejector elbow 40 which is rotatable about an approximately vertical axis by means of a first actuator 46 which is actuated by external force and which is adjustable in terms of inclination by means of a second actuator 48 which is actuated by external force, the ejection direction of the ejector elbow being able to be changed by a flap 50, the inclination thereof being adjustable by means of a third actuator 52 which is actuated by external force. In FIG. 1 the ejector elbow 40 and the flap 50 are shown in their transport position into which they are moved when the forage harvester 10 travels, for example, on a road. During the harvesting process, the ejector elbow 40 is raised by means of the actuator 48 and, by means of the actuator 46, either rotated to one side of the forage harvester 10 when, after the mowing procedure, sufficient space is present at the side of the forage harvester 10 for the transport vehicle 12 on a harvested region 56 of the field, or the ejector elbow remains in the rearwardly oriented position according to FIG. 1 when a passage is first cut into the field.

The cut length of the harvested crop comminuted by the chopper drum 36 depends on the conveying speed of the pre-compression rollers 130, which is able to be changed by means of a drive 132 (see FIG. 4A), and on the rotational speed of the chopper drum 36 and the number of blades distributed about the periphery thereof. The drive 132 may be designed, for example, hydrostatically and may be changed (by a control device 112) by adjusting the absorption volume of the motor which drives the pre-compression rollers 130 and/or the delivery volume of the pump which supplies the motor with hydraulic fluid (see DE 10 2014 219 205 A1). To this end, the drive is connected to the control unit 112, the function and construction thereof being described further below. The control unit 112 is additionally connected to an actuator 134, a processing parameter of the post-processing device 42 being able to be changed thereby, in particular the difference in rotational speed of the two kernel processing rollers, the spacing thereof and/or the contact force thereof.

The transport vehicle 12 and the trailer 16 are of conventional construction. The transport vehicle 12 comprises front steerable wheels 64 and rear driven wheels 66 which are supported on a frame 68 which bears a driver's cab 70.

Figure 3:
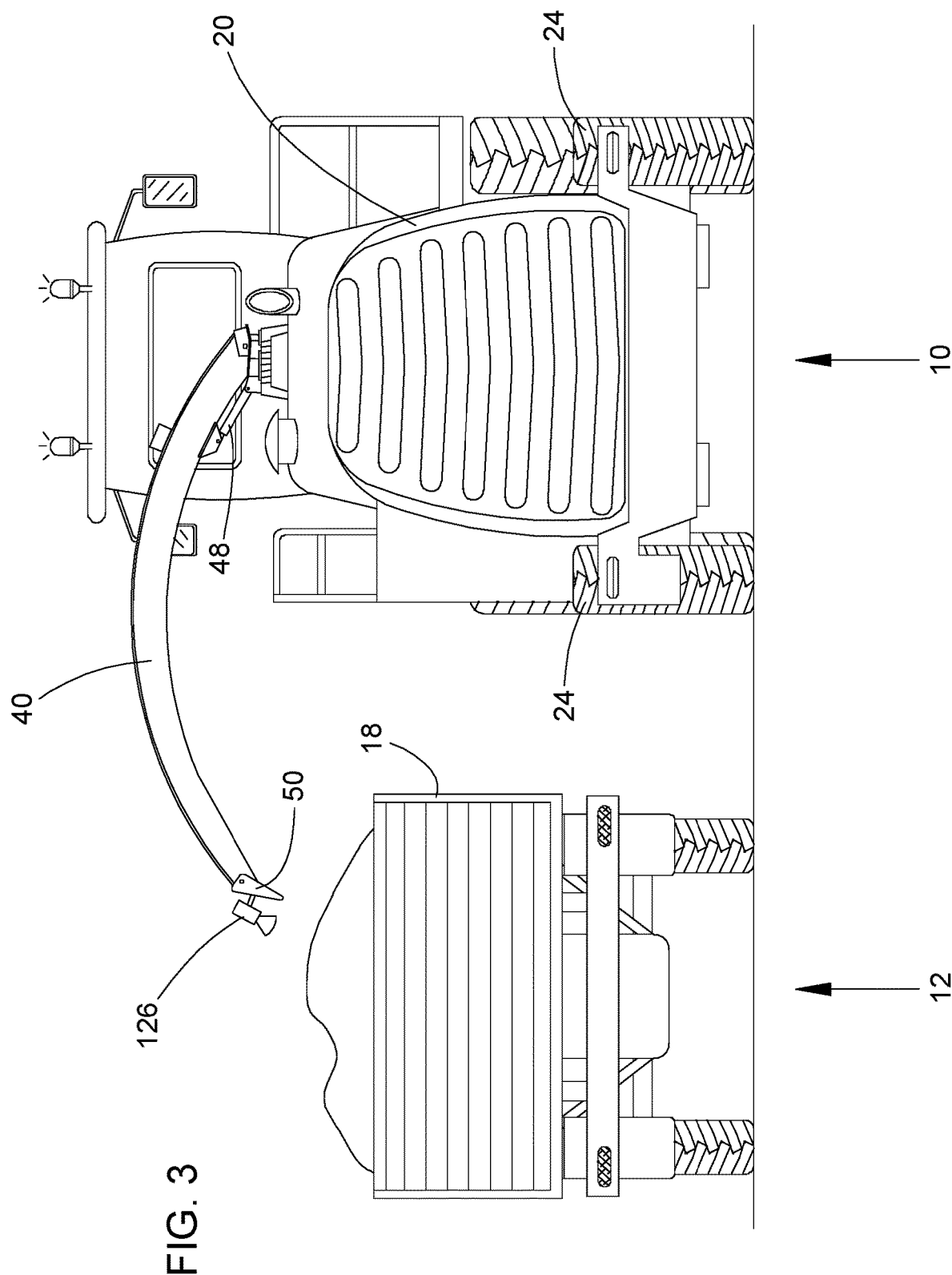
FIG. 3 is a schematic a rear view of the forage harvester and the transport vehicle of FIG. 2.

The forage harvester 10 and the transport vehicle 12 are shown in a plan view in FIG. 2. It may be identified that the forage harvester 10 travels along a harvested crop edge 54 which represents a boundary between the harvested region 56 of the field 34 and the cultivated area 60 of the field 34 which is still standing and occupied by corn plants 58, and harvests the plants 58. The transport vehicle 12 travels on the harvested part 56 of the field parallel to the forage harvester 10 along a path on which the plants chopped by the forage harvester 10 pass through the discharge device into the loading container 18. The transport vehicle 12 thus always has to travel in parallel adjacent to the forage harvester 10; as mentioned above the transport vehicle 12 may also travel to the rear of the forage harvester 10, in particular when traveling into the field, since a harvested part 56 of the field 34 is not yet present on which the transport vehicle 12 could travel without damaging the plants still standing there. Whilst the first loading container 18 of the transport vehicle 12 is filled, a second transport vehicle (not shown) may travel along the side of the first transport vehicle 12 remote from the forage harvester 10 and wait to be used. A rear view of the situation shown in FIG. 2 is shown in FIG. 3.

The forage harvester 10 is steered by a driver seated in the driver's cab 18 or by an automatically operating steering device, known per se. The transport vehicle 12 may be provided with a steering device, described in more detail hereinafter, in order to simplify and/or automate the travel parallel to the forage harvester 10.

The forage harvester 10 is provided with a first position determining device 72 which is located on the roof of the cab 26. A first radio antenna 74 is also positioned there. The first transport vehicle 12 is provided with a second position determining device 76 which is located on the roof of the cab 70. A second radio antenna 78 is also positioned there. Moreover, the forage harvester 10 is provided with a sensor arrangement in the form of a camera 126 which is attached to the outer end of the ejector elbow 40 on the flap 50 and serves for detecting the contours of the loading container 18 and/or its filling state with harvested crop. Alternatively or additionally, a sensor arrangement in the form of a camera 126' is fastened above the roof of the cab 26 on a telescopic mounting 128, which is displaced in harvesting mode into its extended position, as shown in FIG. 1, and otherwise is lowered. Alternatively or additionally, a sensor arrangement in the form of a camera 126" is fastened to the rear of the transport vehicle 12 and has a view of the loading container 18. The cameras 126, 126', 126" may be designed as a three-dimensionally operating Photonic Mixing Device (PMD) camera or as two cameras which are arranged in a common housing and which generate a stereo image, or a two-dimensionally operating camera which is optionally combined with a range finder scanning the field of view. The output signal of the camera 126 and/or 126' and/or 126" is processed by a processing circuit 136 (see FIGS. 4A, 4B).

Figure 4A:
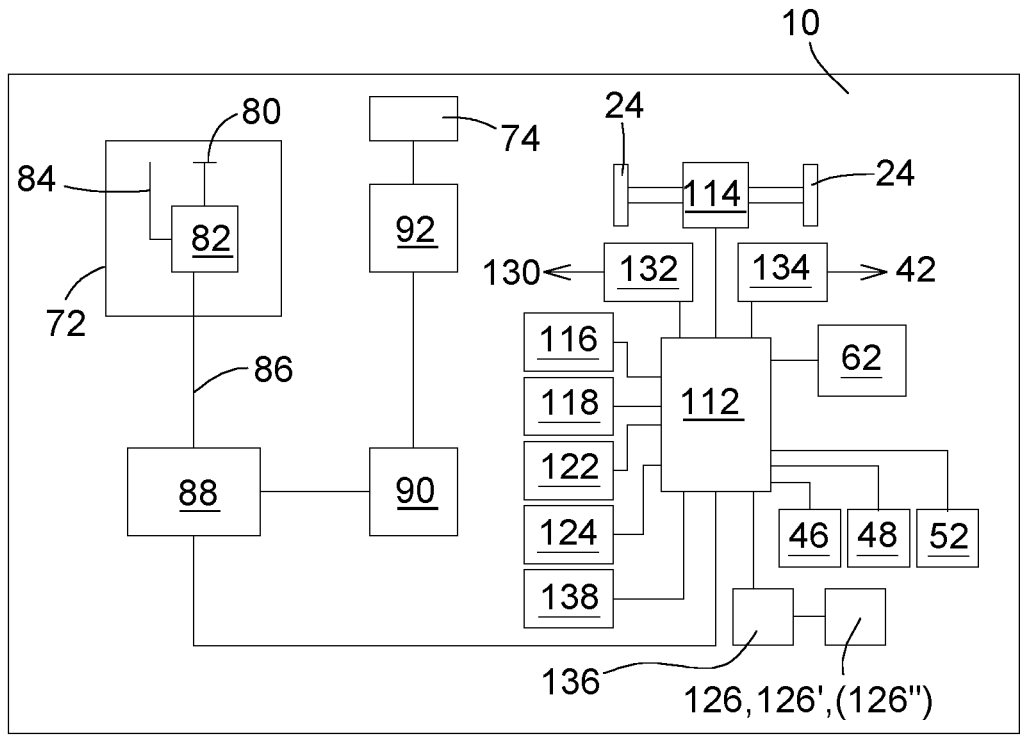
FIG. 4A is a schematic view of a control arrangement for controlling the cut length and the post-processing device of the forage harvester.
Figure 4B:
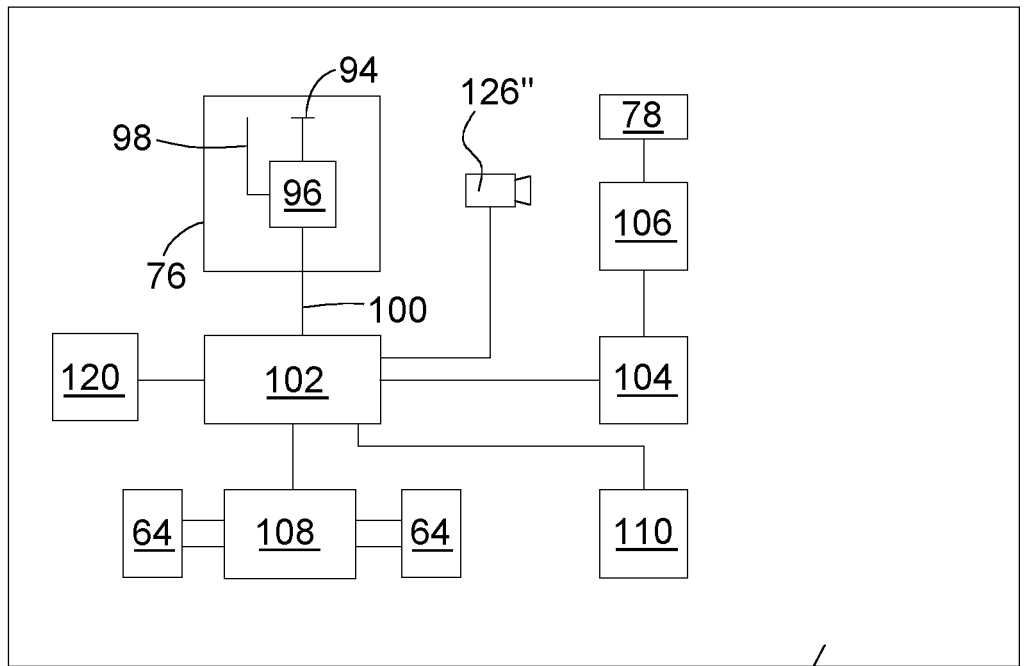
FIG. 4B is a schematic view of the control arrangement for controlling the transfer of the harvested crop to the transport vehicle.

Reference is now made to FIGS. 4A and 4B in which the individual components of the control arrangement are shown for controlling the cut length and/or the processing parameter of the post-processing device 42, which additionally serve for controlling the transfer of the harvested crop from the forage harvester 10 onto the loading container 18, including the camera 126, 126'.

The first position determining device 72 which comprises an antenna 80 and an evaluation circuit 82 connected to the antenna 80 is located on-board the forage harvester 10. The antenna 80 receives signals from satellites of a position determining system such as GPS, Galileo or Glonass which are supplied to the evaluation circuit 82. Using the signals of the satellites, the evaluation circuit 82 determines the current position of the antenna 80. The evaluation circuit 82 is also connected to a correction data receiving antenna 84 which receives radio waves emitted from reference stations at known locations. Using the radio waves, correction data is generated by the evaluation circuit 82 for improving the accuracy of the position determining device 72.

The evaluation circuit 82 transmits via a bus line 86 its positional data to a computer device 88. The computer device 88 is connected via an interface 90 to a receiving and transmitting device 92 which in turn is connected to the radio antenna 74. The receiving and transmitting device 92 receives and generates radio waves which are received and/or emitted by the antenna 74.

Similarly, a second position determining device 76 which comprises an antenna 94 and an evaluation circuit 96 connected to the antenna 94 is located on-board the transport vehicle 12. The antenna 94 receives signals from satellites of the same position determining system as the antenna 80, which are supplied to the evaluation circuit 96. Using the signals of the satellites the evaluation circuit 96 determines the current position of the antenna 94. The evaluation circuit 96 is also connected to a correction data receiving antenna 98 which receives radio waves emitted from reference stations at known locations. Using the radio waves, correction data is generated by the evaluation circuit 96 for improving the accuracy of the position determining device 76.

The evaluation circuit 96 transmits via a bus line 100 its positional data to a computer device 102. The computer device 102 is connected via an interface 104 to a receiving and transmitting device 106 which in turn is connected to the radio antenna 78. The receiving and transmitting device 106 receives and generates radio waves which are received and/or emitted by the antenna 78. By means of the receiving and transmitting devices 90, 106 and the radio antennae 74, 78, data may be transmitted from the computer device 88 to the computer device 102 and vice versa. The connection between the radio antennae 74, 78 may be direct, for example in an authorized radio range such as CB radio, amongst other things, or provided via one or more relay stations, for example when the receiving and transmitting devices 90, 106 and the radio antennae 74, 78 operate according to the GSM or LTE or G5 standard or a different appropriate standard for mobile telephones. The signals of the camera 126" (unprocessed or pre-processed by the computer device 102) are also transmitted to the processing circuit 136 via the radio antennae 74, 78.

The computer device 102 is connected to a steering device 108 which controls the steering angle of the front steerable wheels 64. Moreover, the computer device 102 transmits speed signals to a speed setting device 110 which controls the speed of the transport vehicle 12 by varying the engine speed of the transport vehicle 12 and/or the gear ratio. Moreover, the computer device 102 is connected to a permanent memory 120.

On-board the forage harvester 10 the computer device 88 is connected to the control unit 112. The control unit 112 is connected to a steering device 114 which controls the steering angle of the rear steerable wheels 24. Moreover, the control unit 112 transmits speed signals to a speed setting device 116 which controls the speed of the transport vehicle 12 by varying the gear ratio. The control unit 112 is also connected to a throughput sensor 118 which detects the distance between the pre-compression rollers 130 in the inlet channel, to a sensor for detecting the position of sensing frames 62 attached to a divider point of the harvesting attachment 28, to a permanent memory 122, to the processing circuit 136 and to the actuators 46, 48, 50.

During harvesting, the forage harvester 10 is steered along the harvested crop edge 54 by the control unit 112 outputting to the steering device 114 steering signals which are based on signals from the position determining device 72 and a map stored in the memory 122 which defines a path planned for the next harvesting process, or signals from the sensing frames 62 or a combination of both signals. Alternatively or additionally, the harvested crop edge 54 is detected by a two-dimensional or three-dimensional camera and an image processing system or a laser or ultrasound sensor or scanner and used for generating the steering signal for the steering device 114. The path of the forage harvester 10 does not necessarily have to run in a perfectly straight manner but may also comprise corners depending on the shape of the field. Moreover, turning procedures at the end of the field are also provided.

The speed of advance of the forage harvester 10 may be predetermined by the driver thereof, or the control unit 112 uses the throughput signals of the throughput sensor 118 in order to activate the speed setting device 116 such that a desired throughput through the forage harvester 10 is achieved.

Moreover, the transport vehicle 12 is guided parallel to the forage harvester 10 by the control unit 112 transmitting data to the computer device 102 via the computer device 88 and the radio antennae 74, 78 regarding the position to be activated by the transport vehicle 10. The computer device 102 then correspondingly controls the steering device 108 and the speed setting device 110 by comparing the position detected by the position determining device 76 with the position to be activated and, depending on the result of the comparison, emitting suitable steering signals to the steering device 108. This comparison and the generation of the steering signal for the steering device 108 could also be carried out by the computer device 88 and/or the control unit 112 on-board the forage harvester 10, wherein the positional data are transmitted from the position determining device 76 of the transport vehicle 12 via the radio antennae 74, 78 to the forage harvester 10, whilst the steering signals are transmitted in the reverse direction back to the transport vehicle 12. The transport vehicle 12 follows the forage harvester 10 even when traveling around corners and when turning at the end of the field. The discharge device is automatically oriented toward the loading container 18 by corresponding activation of the actuators 46, 48, 52 by the control unit 112, to this end the control unit 112 using signals from the processing circuit 136 and/or from the computer device 88.

At the same time the loading state of the loading container 18 is detected, the signals of the processing circuit 136, which may be complemented and/or replaced by highly integrated signals of the throughput sensor 118 and/or signals from a sensor 124 for detecting the harvested crop components, serving to this end. If the loading container is not yet filled, it is monitored at the point of the loading container 18 currently supplied with harvested crop whether a desired target filling state is reached. If this is the case, the discharge device is oriented to a different point of the loading container 18. In this case a specific loading strategy may be used, for which reference might be made to the disclosure of DE 10 2008 002 006 A1, the disclosure thereof being incorporated by way of reference in the present application. The signals of the processing device 136 accordingly serve for activating the actuators 46, 48, 52. Additionally or alternatively, the position of the forage harvester 10 is varied by the control unit 112, by the computer device 88 and the radio antennae 74, 78 transmitting corresponding data regarding the position to be activated by the transport vehicle 10 to the computer device 102. As a result, the path of the harvested crop between the discharge end of the discharge device and the loading container 18 may be kept relatively short, which has the advantages that in windy conditions few losses of harvested crop occur and the harvested crop are pre-compressed on the loading container 18.

It should be mentioned that in a simplified embodiment of the disclosure the driver of the forage harvester 10 steers the forage harvester and predetermines the speed thereof, whilst the driver of the transport vehicle 12 may steer the transport vehicle and may predetermine the speeds thereof. However, the actuators 46, 48, 52 are preferably automatically activated, as described above, based on the relative position of the forage harvester 10 and the loading container 18 which is determined by means of the antennae 80, 94 and/or the camera 126 and/or 126' and/or 126". A manual override of an automatic activation of the actuators 46, 48, 52 is expediently provided in each of the described embodiments of the disclosure and preferably take precedence relative to the automatic control. The signals of the camera(s) 126, 126' and/or 126" serve, therefore, in a manner known per se for detecting the contours of the loading container 18 and/or the point of contact of the harvested crop on the loading container 18 processed by the forage harvester 10 (chopped and post-processed) and/or the filling state of the harvested crop in the loading container 18.

For some applications of the harvested crop it is expedient to avoid excessive lengths in the harvested crop. For various reasons it may be the case that a theoretical cut length which is predetermined by the conveying speed of the pre-compression rollers 130, the rotational speed of the chopper drum 36 and the spacing of the blades of the chopper drum 36 in the peripheral direction thereof, is not maintained, for example when slippage is produced due to damp harvested crop when the harvested crop advance through the pre-compression rollers 130, or in the case of high throughputs when not all of the harvested crop are cut but uncut particles pass through the chopper drum 36. Thus an identification of the actual cut length may be expedient in order to perform a post-regulation, in particular, of the conveying speed of the pre-compression rollers 130 by means of the drive 132. In the embodiment of FIGS. 1 to 4, the signals of one or more of the cameras 126, 126', 126" serve therefor.

In other words, the resolution of one or more of the cameras 126, 126', 126" is sufficiently great in order to identify in the harvested crop individual particles of the harvested crop collected in the loading container 18. The processing circuit 136 (or the control unit 112) is programed from the image signal of one or more of the cameras 126, 126', 126" to identify the individual particles (stalk portions, leaf pieces, kernels and broken pieces) regarding the orientation and dimensions in the longitudinal and/or transverse direction and to determine a length distribution. The actual cut length is determined from the length distribution of the stalk portions and optionally the leaf pieces and, by the control device 112 via a corresponding activation of the drive 132, used for the automatic setting of the cut length in the sense of maintaining a desired cut length which is fixedly predetermined or input by the user via a user interface 138, or automatically determined by the control unit 112 using harvested crop parameters such as moisture and/or compressibility or transmitted with an electronic work order (see EP 2 987 396 A1) to the control unit 112. For determining the actual cut length using the images and the setting of the drive 132 reference is made to the prior art according to EP 1 671 530 A1, EP 1 956 361 A2, EP 2 020 174 A1 EP 2 098 109 A1 and EP 2 452 550 A1, the disclosures thereof being incorporated by way of reference in the present application.

Similarly, it is desirable to keep the proportion of kernels in the harvested crop which have not been separated by the post-processing device 42 within specific limits, which may also be input via the user interface 138 or fixedly predetermined or transmitted with an electronic work order (see EP 2 987 396 A1) to the control unit 112. The processing circuit 136 (or the control unit 112) is programed from the image signal of one or more of the cameras 126, 126', 126" to identify the whole kernels and broken pieces thereof and to determine therefrom the proportion of non-separated kernels and if required by adjusting the actuator 134 to change a processing parameter of the post-processing device 42, in particular the difference in rotational speed of the two kernel processing rollers, the spacing thereof and/or the contact force thereof. For identifying the separated and non-separated kernels by means of image processing, in particular by self-teaching systems (neural networks, etc.), reference should be made to the disclosures of EP 2 232 978 A1, EP 2 982 232 A2 and EP 3 646 703 A1 and of Luck et al. and Rasmussen et al., loc. cit., which are incorporated by way of reference in the present application. Additionally, the determined proportion of the unprocessed kernels may be displayed on a screen of the user interface 138.

FIG. 5 shows the user interface 138 during harvesting mode after a menu item which permits a display of the properties of the harvested crop has been selected. The screen 140 of the user interface 138, which in a manner known per se is designed as a touch-sensitive screen for selecting menu items and inputs, or may be provided with keys arranged adjacent to the screen 140, the respective meaning thereof being displayed on the screen 140, displays in a first window 142 the image of the harvested crop which is recorded by the camera 126, 126', 126". In this case, rather than the whole image, a representative detail which is taken from the cone of bulk harvested crop material currently piling up on the loading container 18 is displayed in order to represent the harvested crop as far as possible in a manner which is timely and current and to prevent that harvested crop, which have already been filled-in a relatively long time ago and which are no longer representative, form the basis of the display (and the determination of the cut length and the proportion of the non-separated kernels). The harvested crop which are still flowing in and still moving are also not displayed as far as possible and also not used for determining the cut length and the proportion of the non-separated kernels. In the window 142 the original unprocessed image may be displayed or the identified particles (such as stalk portions 144, leaf portions 150, whole kernels 146 and beaten kernels (broken pieces) 148 are marked, for example, by color. Additionally, the proportion of the non-separated kernels is displayed in a second window 150 and a histogram of the cut length distribution is displayed in a third window 152.

Figure 6:
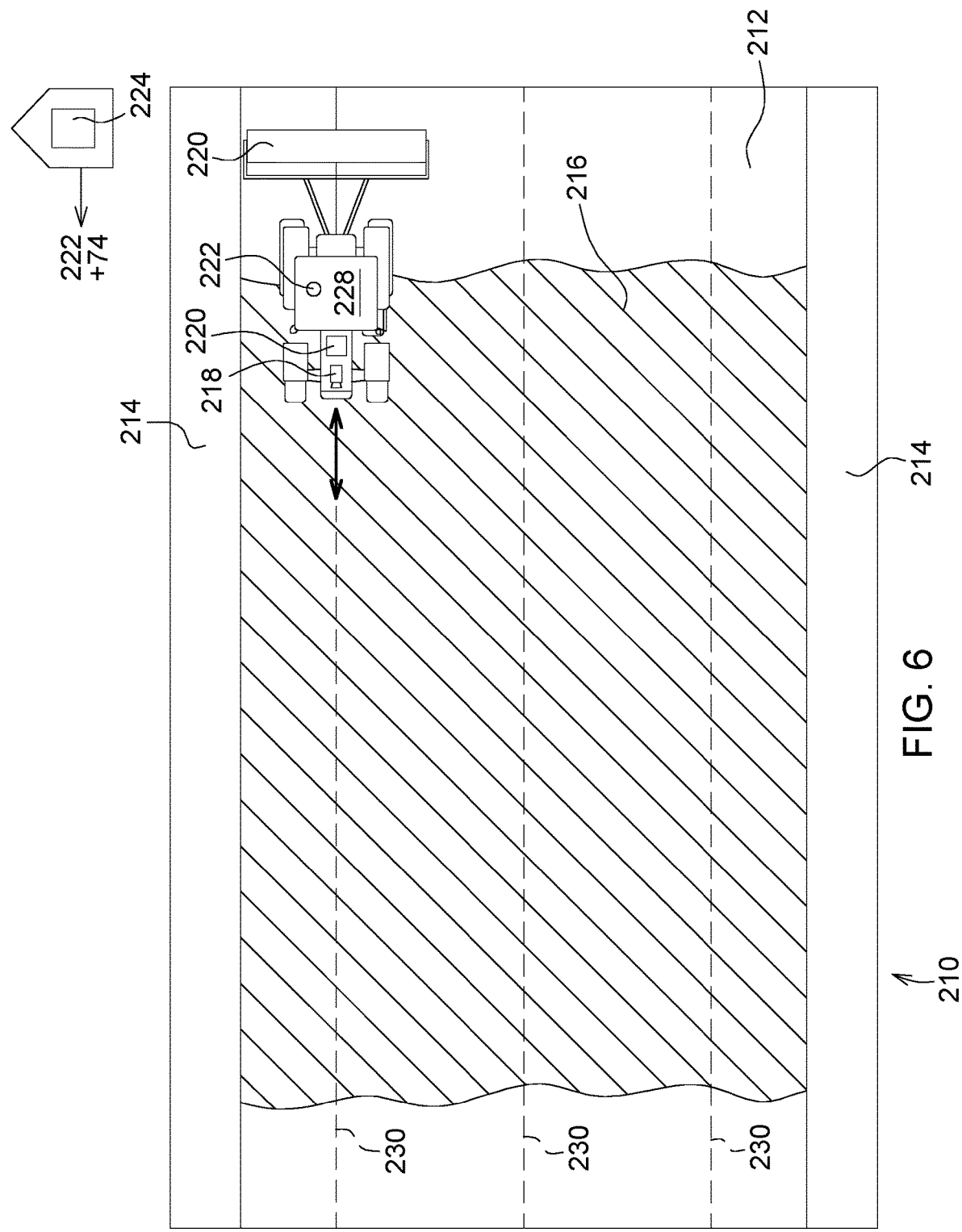
FIG. 6 is a schematic plan view of a silo with a compressing vehicle operating therein.

The harvested crop which are harvested by the forage harvester 10, which is shown in FIGS. 1 to 4, are transported by the transport vehicle 12 to a silo 210 and deposited there, which is shown in FIG. 6. The silo 210, designed as a so-called bunker silo, comprises a base 212 and lateral walls 214 which are generally all produced from concrete. The silo 210 is designed as a drive-over silage pile into which the chopped green plants 58 are introduced as silage 216, distributed and compressed as known per se in the prior art (EP 3 403 487 A1, EP 3 403 488 A1, the entire disclosure thereof being incorporated by way of reference in the present application) and thus is open to the left and right. The harvested crop are directly discharged from the loading container 18 to the silo 210 or initially deposited in the vicinity thereof on a heap and distributed on the silo 210 by a suitable vehicle or other means. A further embodiment, not illustrated, of a harvesting chain, which is suitable in particular for grass harvesting, may comprise a field tractor and a forage box towed thereby. The harvested crop are then compressed by a compressing vehicle 228 which carries out passes 230 over the silo 210. In FIG. 6 it is assumed that the compressing vehicle 228 moves a relatively broad compressing device 220 which has a relatively large working width so that only three passes 230 are illustrated. If no compressing device 220 is used and the compressing only takes place by the wheels of the compressing vehicle 228, naturally significantly more passes 230 have to be made.

The compressing vehicle 228 is provided with a camera 218 which is oriented to the front and generates an image of the silage 216. A corresponding signal which is derived from the image of the silage, or is representative thereof, is transmitted by means of a computer device 220 via an antenna arrangement 222 to a remote server 224 (which may be embodied in the cloud) and which in turn is communicatively connected to the antenna 74 of the forage harvester 10. The computer device 220 may pre-process the image of the camera 218, i.e. in the above-described manner identify the individual particles (stalk parts, leaf parts, whole kernels and broken kernel pieces) or even identify the average cut length and/or the proportion of non-separated kernels. Thus the unprocessed image of the camera 218 and/or the pre-processed image and/or the cut length distribution extracted therefrom and/or the proportion of non-separated kernels may be transmitted via the antenna arrangement 222 and the server 224 to the control unit 112 of the forage harvester 10 of FIGS. 1 to 4 (which in this embodiment does not necessarily have to be provided with a camera 126, 126', 126"). Thus in the case of the forage harvester 10 it is possible to proceed in a similar manner to the above description, i.e. on the one hand the unprocessed or pre-processed image (by the computer device 220 and/or the control device 112 and/or the processing circuit 136) may be displayed on the screen 140 of the user interface 138, and on the other hand the cut length distribution determined by using the pre-processed image may be displayed and/or may be used for activating the drive 132, and/or the proportion of non-separated kernels determined using the pre-processed image may be displayed and/or used for activating the actuator 134. In a further embodiment, the indirect route via the server 224 may be avoided and the antenna arrangement 222 may communicate directly with the antenna 74 of the forage harvester 10.

The signals of the camera 218 may also be used by the computer device 220 for activating the compressing vehicle 228, for example by the height of the silage 216 being identified and based thereon a decision being made as to whether further passes are required in order to achieve a desired compression of the silage 216. To this end, reference is made to the disclosure of DE 10 2020 110 297 A1 which is incorporated by way of reference in the present application.

It should also be mentioned that further simplified embodiments are possible. Thus, a photograph of the chopped, post-processed harvested crop may be taken by a digital camera (for example of a mobile telephone or tablet), whether on the silo 210 or any point of the transport chain of the harvested crop from the field to the silo 210, and wirelessly transmitted to the control device 112 or a mobile telephone (not shown) of the user of the forage harvester 10, whether directly or via the server 224. For simplifying the identification of the individual particles it might also be conceivable to remove a sample of the silage 216 from the silo or from the harvested crop on the loading container 18 and distribute on a suitable substrate.

A pre-processing of the image may be carried out by the control device 112 or a processor of the mobile telephone, and the pre-processed image and/or the determined cut length distribution and/or the determined proportion of the unprocessed kernels is displayed as described with reference to FIG. 5. On the basis thereof, the user of the forage harvester 10 may, if required, change a parameter of the forage harvester 10 as described above, by suitable user inputs in the interface 138 or further input elements of the forage harvester 10 or even by manual adjustment, for example of the spacing between the rollers of the post-processing device 42.

Moreover, it may be advantageous when creating the image of the harvested crop to subject the harvested crop additionally to the light of other wavelengths (UV, near infrared, etc.) and to subject the reflected light to a spectral analysis and also to make this information available to the user of the forage harvester 10 via the user interface 138 or mobile telephone. The camera 126, 126' 126" and/or 218 may thus be combined with a spectrometer in order to determine further properties of the harvested crop such as constituent parts, and/or the sample may be subjected to light having wavelengths which are different from the visible spectrum and/or the reflected light may be spectrally separated in order to make the kernels or other components of the harvested crop more clearly identifiable. The user may also in turn configure the windows 142, 150, 152 displayed on the screen 140 by means of the user interface 138, so that specifically the information is displayed which the user might desire to receive, and the user may additionally establish whether he himself would like to undertake an adjustment and, if required, a change to the machine parameters (cut length, setting of post-processing device 42) or whether these are to be automatically carried out. Combinations of the image information of the silage sample and information of the NIR spectroscopy may also be configured on the control panel according to the wishes of the driver and combined together in a display.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method for controlling one or more operating parameters of a forage harvester, the method comprising:
    picking up harvested crop from a field by means of a harvesting attachment;
    processing the harvested crop with one of a chopping device or a post-processing device;
    ejecting the processed harvested crop onto a loading container;
    recording an image of the processed harvested crop in the loading container with a camera; and
    setting an operating parameter of the forage harvester with a control unit based on the image of the processed harvested crop.

2. The method set forth in in claim 1, further comprising determining a quality parameter of the harvested crop by an electronic image processing system using the image, the operating parameter being set by the determined quality parameter.

3. The method set forth in claim 2, further comprising transmitting one of the image, the quality parameter determined by the image processing system using the image, or an optimized operating parameter derived determined quality parameter to one of a display unit or the control unit.

4. The method set forth in claim 3, wherein one of the image, the quality parameter derived therefrom, or the optimized operating parameter is communicated from the camera located at a collection point of the harvested crop to the forage harvester.

5. The method set forth in claim 2, wherein a user predetermines the operating parameter using one of the displayed image, the quality parameter, or the optimized operating parameter, and wherein the method further comprises automatically setting the operating parameter with the control unit by using one of the image, the quality parameter, or the optimized operating parameter.

6. The method set forth in claim 1, wherein the operating parameter influences one of the cut length of the harvested crop achieved by the chopping device or an operating parameter of a kernel processor of the post-processing device.

7. The method set forth in claim 6, wherein the quality parameter relates to one of the measured cut length of the harvested crop or the proportion of non-separated kernels of the harvested crop.

8. The method set forth in claim 1, wherein the camera is attached to one of the forage harvester, the loading container, a vehicle bearing or towing the loading container, or a compressing vehicle.

9. The method set forth in claim 8, further comprising automatically positioning the loading container relative to the forage harvester with the control unit using the image from the camera.

10. The method set forth in claim 8, further comprising automatically controlling the position of an ejection elbow of the forage harvester with the control unit using the image from the camera.

11. A control system for controlling one or more operating parameters of a forage harvester, the control system comprising:
- a harvesting attachment for picking up harvested crop from a field;
- a post-processing device for processing the harvested crop;
- an ejector elbow for ejecting the processed harvested crop onto a loading container;
- a camera positioned for recording an image of the processed harvested crop in the loading container;
- a control unit having a memory operable to record the image of the harvested crop; and
- wherein the control unit is operable to adjust an operating parameter of the forage harvester based on the image.

\* \* \* \* \*